W. E. WITT.
SWINGLETREE HOOK.
APPLICATION FILED APR. 23, 1912.
1,061,435.
Patented May 13, 1913.
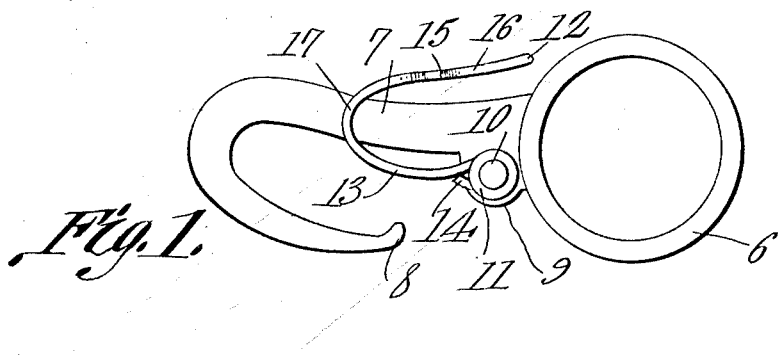
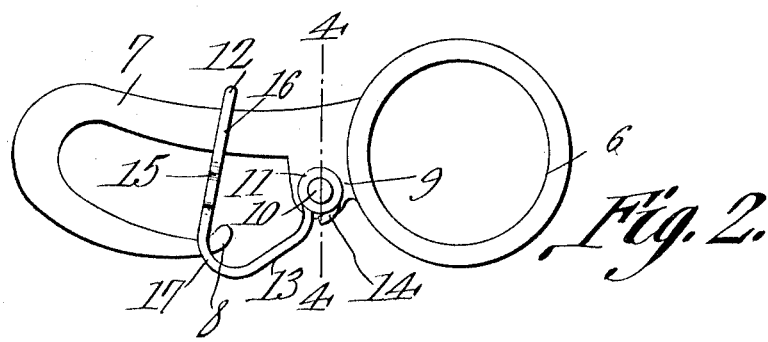
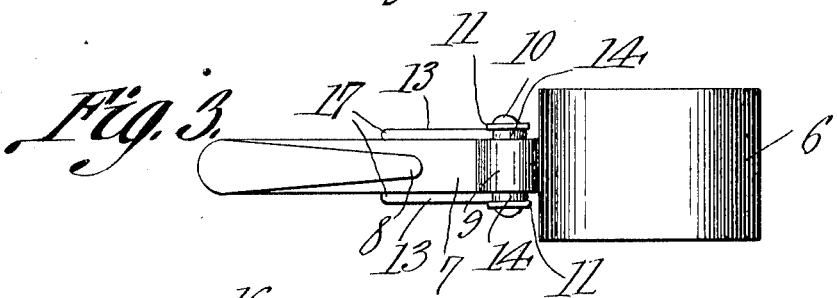
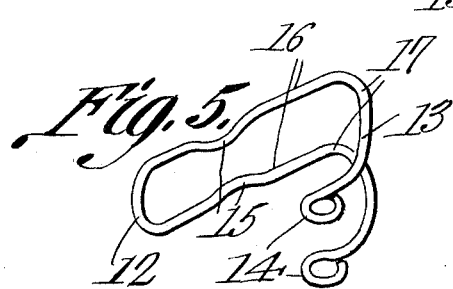
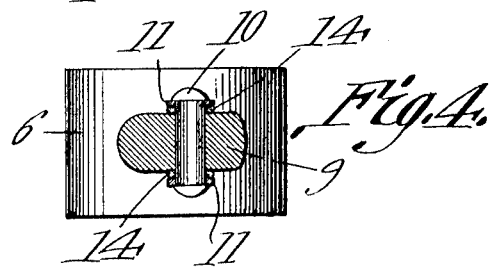

UNITED STATES PATENT OFFICE.

WARREN E. WITT, OF RAYMOND, ILLINOIS.

SWINGLETREE-HOOK.

1,061,435.  Specification of Letters Patent.  Patented May 13, 1913.

Application filed April 23, 1912. Serial No. 692,742.

*To all whom it may concern:*

Be it known that I, WARREN E. WITT, a citizen of the United States, residing at Raymond, in the county of Montgomery and State of Illinois, have invented a new and useful Swingletree-Hook, of which the following is a specification.

This invention relates to a swingletree hook, and has for its primary object to produce a hook of this character for the attachment of tugs or traces and provided with means for preventing the accidental detachment of the tug or trace and to further prevent the entanglement of the tail of the horse or other draft animal, or any other object, with the hook. This invention also contemplates a device of this character which shall be simple, durable and inexpensive in construction, as well as convenient and efficient in use.

With the foregoing and other objects in view, which will be apparent as the invention is better understood, this invention resides in the novel construction and combination of parts hereinafter described and particularly pointed out in the appended claim, it being understood that this device is susceptible of alterations or deviations in its details within the scope of the appended claim without departing from the spirit of the invention.

The invention is illustrated in its preferred embodiment in the accompanying drawings, wherein similar reference characters have been employed to denote corresponding parts, and wherein:—

Figure 1 is a side elevation of the present hook showing the guard when not in use. Fig. 2 is a similar view showing the guard as swung into position for retaining the tug or trace in position. Fig. 3 is plan view of the hook. Fig. 4 is a sectional view taken on the line 4—4 Fig. 2. Fig. 5 is a perspective view of the guards.

Referring specifically to the drawings, the numeral 6 designates a cockeye for engagement with the swingletree, and which has a tug or trace hook 7 attached thereto. The butt end of the shank of the hook is attached to the cockeye 6 so that the shank projects radially from the cockeye, the tip or point of the bill of the hook being designated by the numeral 8 and being curved toward the shank. An ear 9 is provided within the crotch between the shank of the hook and the cockeye 6, and a pin or rivet 10 passes through the ear 9 and has the ends thereof headed. This pin or rivet 10 has the washers 11 mounted on the ends thereof. The cockeye 6, hook 7 and the ear 9 are preferably cast or forged integral, and may be constructed of any suitable metal.

The guard comprises a doubled resilient wire forming a U-shaped member 12, which has the ends thereof formed into eyes 14 engaging the ends of the rivet 10 within the washers 11. The guard straddles the shank of the hook from opposite the tip of the bill and has its branches bent to form elbows 17. The guard is pivoted to the butt end of the shank in order that the elbows 17 may swing over and away from the tip of the bill. The arms 16 between the elbows 17 and the bend of the guard are provided with inset portions or indents 15 adapted to snap over the shank of the hook. These portions 15 are adapted to snap over the shank 7 when the elbows 17 are passed over the end of the hook so that the guard will be retained in position, and in a similar manner, when the guard is swung away from the end of the hook, the inwardly bowed portions 15 will be snapped over the shank of the hook in order to retain the guard in inoperative position. When the guard is swung toward the end of the hook, the arms 13 of the elbows will close the gap between the end of the hook and the ear 9 and serve to prevent the entanglement of the tail of the horse or other draft animal, or other objects, with the hook. The bend of the guard serves as a stop in order to limit the swinging movement of the guard, the bend being arranged to strike the shank of the hook when the joints of the elbows thereof have passed over the tip of the hook.

It will thus be seen, that when the tug or trace is engaged to the hook, the guard may be swung toward or over the end of the hook so as to prevent the accidental displacement of the trace or tug, and to also prevent the entanglement of other objects with the hook. The guard serves to effectually prevent the detachment of the trace or tug and is readily operable.

This device is also simple in construction, consisting of but few parts, and is capable of inexpensive manufacture. It is also possible to use this hook for various purposes, as will be apparent.

What is claimed is:

A swingletree hook embodying a shank and a bill having its tip curved toward the shank, a pin passing through the butt end of the shank, and a resilient U-shaped guard straddling the shank from opposite the tip of the bill and having its branches bent to form elbows and its ends bent into eyes embracing the ends of the pin, so that when the bend of the guard is swung against the shank of the hook, the tip of the bill will project and terminate between the elbows, those arms of the guard between the elbows and bend being provided with inwardly bowed portions to snap over the shank of the hook.

In testimony that I claim the foregoing as my own, I have hereto affixed my signature in the presence of two witnesses.

WARREN E. WITT.

Witnesses:
W. H. SCHERER,
LEW L. POTTS.

Copies of this patent may be obtained for five cents each, by addressing the "Commissioner of Patents, Washington, D. C."